(12) United States Patent
Chang et al.

(10) Patent No.: US 9,207,076 B2
(45) Date of Patent: Dec. 8, 2015

(54) COMPUTING DEVICE AND METHOD FOR DETERMINING RICOCHET VECTORS OF A PROBE OF A COORDINATE MEASURING MACHINE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Chih-Kuang Chang, New Taipei (TW); Zhong-Kui Yuan, Shenzhen (CN); Zheng-Cai She, Shenzhen (CN); Yu-Hua Xu, Shenzhen (CN); Xiao-Guang Xue, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 527 days.

(21) Appl. No.: 13/710,661

(22) Filed: Dec. 11, 2012

(65) Prior Publication Data

US 2013/0162815 A1    Jun. 27, 2013

(30) Foreign Application Priority Data

Dec. 21, 2011    (CN) .......................... 2011 1 0432958

(51) Int. Cl.
*G01C 15/00* (2006.01)
*G01B 21/04* (2006.01)
*G01B 5/008* (2006.01)
*G06F 15/00* (2006.01)

(52) U.S. Cl.
CPC ................ *G01C 15/00* (2013.01); *G01B 5/008* (2013.01); *G01B 21/045* (2013.01); *G06F 15/00* (2013.01)

(58) Field of Classification Search
CPC ........ G01B 5/008; G01B 7/008; G01B 21/04; G01B 21/045; G01C 15/00; G06F 15/00
USPC ................ 33/503, 504, 556, 559; 702/94, 95
See application file for complete search history.

(56) References Cited

U.S. PATENT DOCUMENTS 6,601,311 B2 *  8/2003  McMurtry et al. .............. 33/502
6,640,607 B2 * 11/2003  Abbe ............................ 73/1.01

(Continued)

FOREIGN PATENT DOCUMENTS

WO    WO 2010037506 A2 *  4/2010    ............ G01B 21/04

*Primary Examiner* — R. A. Smith
(74) *Attorney, Agent, or Firm* — Novak Druce Connolly Bove + Quigg LLP

(57) ABSTRACT

In a method for determining ricochet vectors of a probe of a coordinate measuring machine (CMM) using a computing device, the computing device sets an approach distance between the probe and a manufactured object. Coordinates of a center of the probe and an initial vector of the probe for each measurement point of the manufactured object are obtained when the probe is manually operated to measure the manufactured object. A measurement element of the manufactured object is fit according to all measurement points of the manufactured object. For each measurement point, an approach point of the manufactured object is calculated, a position relation between the approach point and the measurement element of the manufactured object is determined, and a ricochet vector of the probe is calculated according to the position relation.

15 Claims, 4 Drawing Sheets

(56) References Cited

U.S. PATENT DOCUMENTS

| | | | |
|---|---|---|---|
| 7,370,430 B2* | 5/2008 | Chang et al. | 33/503 |
| 7,958,564 B2* | 6/2011 | Noda et al. | 850/21 |
| 8,983,795 B2* | 3/2015 | Lotze et al. | 702/150 |
| 2006/0117587 A1* | 6/2006 | Lotze | 33/559 |
| 2011/0056085 A1* | 3/2011 | Jordil | 33/503 |
| 2011/0191060 A1* | 8/2011 | Lotze et al. | 702/150 |
| 2014/0222189 A1* | 8/2014 | Chang et al. | 700/195 |

\* cited by examiner

COMPUTING DEVICE AND METHOD FOR DETERMINING RICOCHET VECTORS OF A PROBE OF A COORDINATE MEASURING MACHINE

BACKGROUND

1. Technical Field

The embodiments of the present disclosure relate to measuring manufactured objects, and particularly to a computing device and method for determining ricochet vectors of a probe of a coordinate measuring machine.

2. Description of Related Art

Coordinate measuring machines (CMMs) are widely used in industry to measure manufactured objects (e.g., metal castings). A CMM includes a probe used to contact with surfaces of the manufactured object, to obtain coordinates of the surfaces of the manufactured object. When the CMM performs automatic measurement of the manufactured object, contact points of the manufactured object are determined according to ricochet vectors of the probe. The ricochet vectors indicate directions in which the probe moves towards or away from the manufactured object. If the ricochet vectors are found to be incorrect, the contact points of the manufactured object may be inaccurate, so that measurement results of the manufactured objects may be unreliable.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
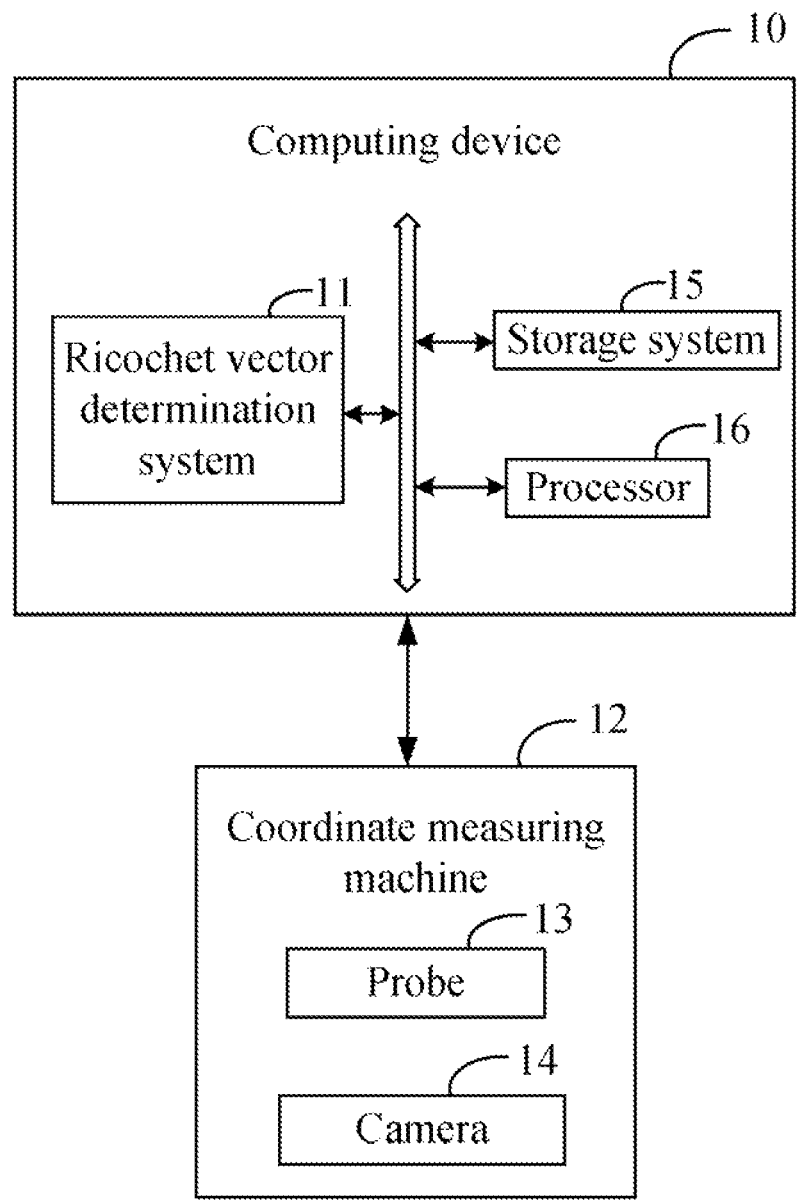
FIG. 1 is one embodiment of an application of a computing device.

FIG. 1 is one embodiment of an application of a computing device 10. In the embodiment, the computing device 10 is connected to a coordinate measuring machine (CMM) 12. The CMM 12 includes a probe 13 and a camera 14. The probe 13 contacts surfaces of a manufactured object (not shown in FIG. 1) when the CMM 12 performs measurement of the manufactured object. The manufactured object may be a molded part, such as a metal casting, for example. When the probe 13 moves to measure the manufactured object, the camera 14 focuses on the manufactured object. According to a focus position of an optical lens of the camera 14, coordinates of a center point of the probe 13 are obtained.

The computing device 10 includes a ricochet vector determination system 11, a storage system 15, and at least one processor 16. The ricochet vector determination system 11 is used to determine ricochet vectors of the probe 13. The ricochet vectors indicate directions in which the probe 13 moves towards or away from the manufactured object when the CMM 12 performs automatic measurement of the manufactured object. In one embodiment, a magnitude of each of the ricochet vectors is 1. The storage system 16 may be a dedicated memory, such as an EPROM, a hard disk drive (HDD), or flash memory. In some embodiments, the storage system 16 may be an external storage device, such as an external hard disk, a storage card, or a data storage medium.

Figure 2:
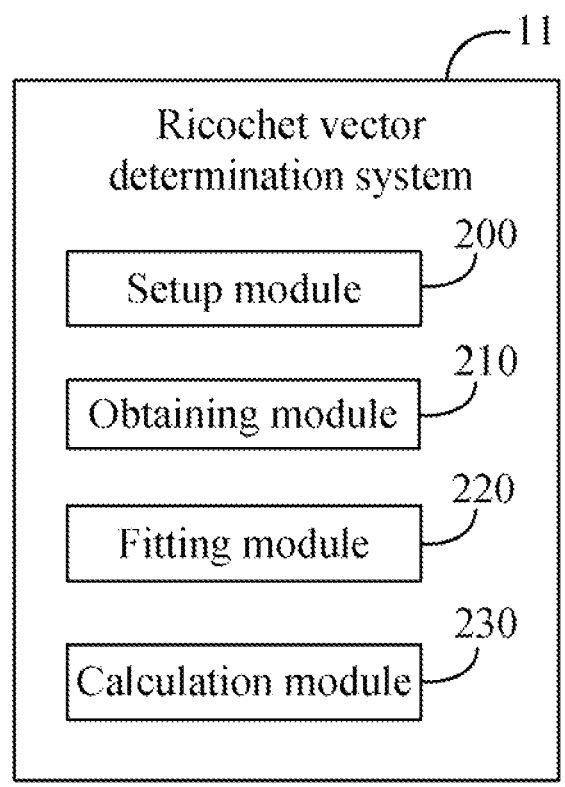
FIG. 2 is a block diagram of one embodiment of function modules of a ricochet vector determination system in FIG. 1.

FIG. 2 is a block diagram of one embodiment of function modules of the ricochet vector determination system 11 in FIG. 1. The ricochet vector determination system 11 includes a setup module 200, an obtaining module 210, a fitting module 220, and a calculation module 230. The modules 210-230 may comprise computerized code in the form of one or more programs that are stored in the storage system 15. The computerized code includes instructions that are executed by the at least one processor 16, to provide the aforementioned functions of the ricochet vector determination system 11. A detailed description of the functions of the modules 210-230 is given in reference to FIG. 3.

Figure 3:
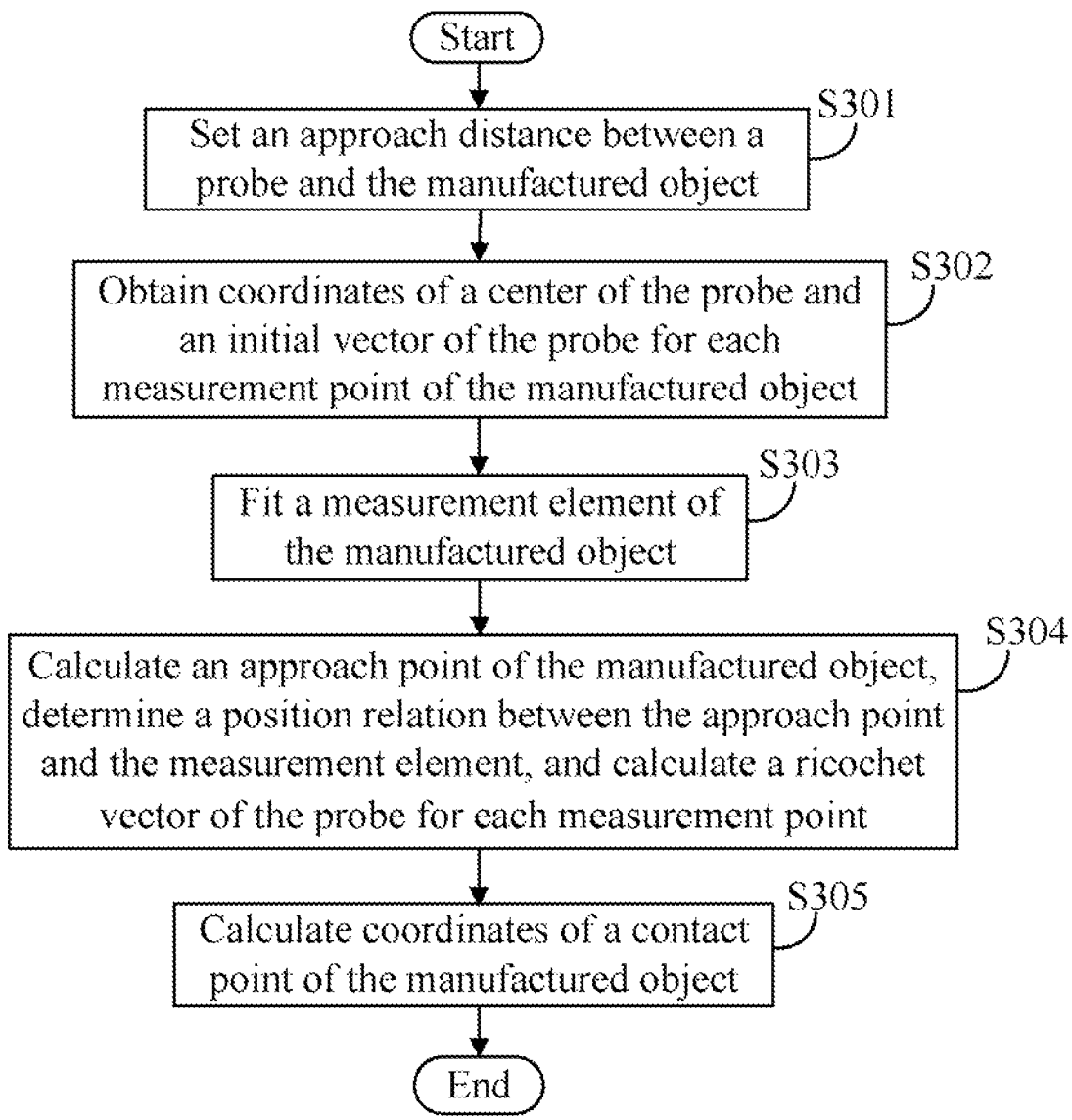
FIG. 3 is a flowchart of one embodiment of a method for determining ricochet vectors of a probe of a coordinate measuring machine using the computing device in FIG. 1.

FIG. 3 is a flowchart of one embodiment of a method for determining ricochet vectors of the probe 13 using the computing device 10 in FIG. 1. Depending on the embodiment, additional steps may be added, others removed, and the ordering of the steps may be changed.

In step S301, the setup module 210 sets an approach distance between the probe 13 and the manufactured object, and stores the approach distance into the storage system 15. The probe 13 may move towards the manufactured object at a predetermined speed within the approach distance.

In step S302, the obtaining module 220 obtains coordinates of a center of the probe 13 and an initial vector of the probe 13 for each measurement point of the manufactured object when the probe 13 is manually operated to measure the manufactured object. The probe 13 contacts the manufactured object at each measurement point when the probe 13 is manually operated to measure the manufactured object. In one example, five un-collinear measurement points are selected when the probe 13 is manually operated to measure a sphere. The initial vector of the probe 13 indicates a direction in which the probe 13 moves towards the measurement point in manual measurement. In this embodiment, the obtaining module 220 obtains the coordinates of the center of the probe 13 for the measurement points according to the focus position of the optical lens of the camera 14.

In step S303, the fitting module 230 fits a measurement element of the manufactured object according to all measurement points of the manufactured object. The measurement element may be a line, a plane, a circle, an arc, an ellipse, or a sphere. In one example, the fitting module 230 fits a sphere of the manufactured object according to the five un-collinear measurement points. In one embodiment, the fitting module 230 uses a method of least squares, in conjunction with the quasi-Newton iterative algorithm, to fit the measurement element of the manufactured object.

In step S304, for each measurement point, the calculation module 230 calculates an approach point of the manufactured object according to the approach distance and a corresponding initial vector of the probe 13, determines a position relation between the approach point and the measurement element of the manufactured object, and calculates a ricochet vector of the probe 13 according to the position relation. A distance between the measurement point and a corresponding approach point is equal to the approach distance. A direction from the corresponding approach point to the measurement point is in the same direction as a direction of a corresponding initial vector of the probe 13. When the CMM 12 performs automatic measurement of the manufactured object, the probe 13 moves towards the measurement point in an opposite direction of the ricochet vector and bounces off the measurement point in the direction of the ricochet vector. The calculation module 230 further stores the ricochet vector of the probe 13 into the storage system 15.

Figure 4:
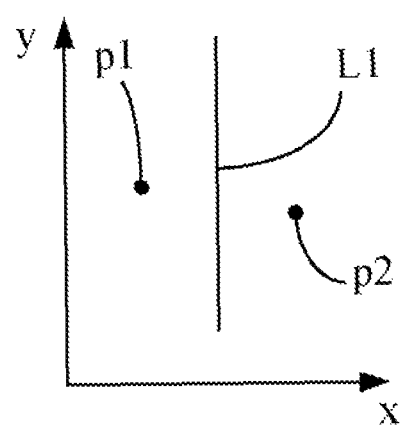
FIG. 4 illustrates one embodiment of calculating ricochet vectors of a probe, where a measurement element of a manufactured object is a line on an XY plane and a slope of the line does not exist.

In one example with respect to FIG. 4, the measurement element of the manufactured object is a line on an XY plane. If a slope of the line does not exist and the approach point of the manufactured object is located on the left side of the line (e.g., a point labeled "p1"), the ricochet vector of the probe 13 is (−1, 0, 0). If the slope of the line does not exist and the approach point of the manufactured object is located on the right side of the line (e.g., a point labeled "p2"), the ricochet vector of the probe 13 is (1, 0, 0). If the slope of the line exists and a direction vector of the line is (a, b, 0), where a and b are the distance along the x and y coordinates respectively, the ricochet vector of the probe 13 is (i, j, 0), where i and j are calculated according to equations $i^2+j^2=0$ and $a*i+b*j=0$. If the approach point of the manufactured object is located on the upper side of the line and the slope of the line is less than 0, or if the approach point of the manufactured object is located on the down side of the line and the slope of the line is larger than 0, i and j are calculated as follows:

$$i = \sqrt{\frac{b^2}{a^2+b^2}}$$

and $$j = -\frac{a}{b}*i.$$

If the approach point of the manufactured object is located on the upper side of the line and the slope of the line is larger than 0, or if the approach point of the manufactured object is located on the down side of the line and the slope of the line is less than 0, i and j are calculated as follows:

$$i = -\sqrt{\frac{b^2}{a^2+b^2}}$$

and $$j = -\frac{a}{b}*i.$$

In another example, the measurement element of the manufactured object is a plane. If a scalar product of the initial vector of the probe 13 and a normal vector of the plane is less than 0, the ricochet vector of the probe 13 is equal to the normal vector of the plane. If the scalar product of the initial vector of the probe 13 and the normal vector of the plane is larger than 0, a magnitude of the ricochet vector of the probe 13 is equal to a magnitude of the normal vector of the plane, and a direction of the ricochet vector of the probe 13 is opposite to a direction of the normal vector of the plane.

In step S305, for each measurement point, the calculation module 230 calculates coordinates of a contact point of the manufactured object according to the coordinates of the center of the probe 13 and the ricochet vector of the probe 13, and stores the coordinates of the contact point into the storage system 15. The probe 13 contacts the manufactured object at the contact point when the CMM 12 performs automatic measurement of the manufactured object. In one embodiment, coordinates of the contact point of the manufactured object is calculated as follows: $(x1, y1, z1)=(x0, y0, z0)-R \times (a, b, c)$, where $(x1, y1, z1)$ is the coordinates of the contact point of the manufactured object, $(x0, y0, z0)$ is the coordinates of the center of the probe 13, R is a radius of the probe 13, and $(a, b, c)$ is the ricochet vector of the probe 13.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A method for determining ricochet vectors of a probe of a coordinate measuring machine (CMM) being executed by a processor of a computing device, the method comprising:
    setting an approach distance between the probe and a manufactured object, and storing the approach distance into a storage system of the computing device;
    obtaining coordinates of a center of the probe and an initial vector of the probe for each measurement point of the manufactured object when the probe is manually operated to measure the manufactured object;
    fitting a measurement element of the manufactured object according to all measurement points of the manufactured object; and
    for each measurement point, calculating an approach point of the manufactured object according to the approach distance and the initial vector of the probe, determining a position relation between the approach point and the measurement element of the manufactured object, calculating a ricochet vector of the probe according to the position relation, and storing the ricochet vector of the probe into the storage system.

2. The method of claim 1, further comprising:
    calculating coordinates of a contact point of the manufactured object for each measurement point according to the coordinates of the center of the probe and the ricochet vector of the probe, and storing the coordinates of the contact point into the storage system, wherein the probe contacts the manufactured object at the contact point when the CMM performs automatic measurement of the manufactured object.

3. The method of claim 1, wherein a distance between the measurement point and a corresponding approach point is equal to the approach distance, and a direction from the corresponding approach point to the measurement point is in the same direction as a direction of a corresponding initial vector of the probe.

4. The method of claim 1, wherein the coordinates of the center of the probe are obtained according to a focus position of an optical lens of a camera installed on the CMM.

5. The method of claim 1, wherein a magnitude of the ricochet vector of the probe is 1.

6. A computing device, comprising:
a storage system;
at least one processor; and
a ricochet vector determination system comprising one or more programs that are stored in the storage system and executed by the at least one processor, the one or more programs comprising instructions to:
set an approach distance between a probe of a coordinate measuring machine (CMM) and a manufactured object, and store the approach distance into a storage system of the computing device;
obtain coordinates of a center of the probe and an initial vector of the probe for each measurement point of the manufactured object when the probe is manually operated to measure the manufactured object; fit a measurement element of the manufactured object according to all measurement points of the manufactured object; and
for each measurement point, calculate an approach point of the manufactured object according to the approach distance and the initial vector of the probe, determine a position relation between the approach point and the measurement element of the manufactured object, calculate a ricochet vector of the probe according to the position relation, and store the ricochet vector of the probe into the storage system.

7. The computing device of claim 6, wherein the one or more programs further comprise instructions to:
calculate coordinates of a contact point of the manufactured object for each measurement point according to the coordinates of the center of the probe and the ricochet vector of the probe, and store the coordinates of the contact point into the storage system, wherein the probe contacts with the manufactured object at the contact point when the CMM performs automatic measurement of the manufactured object.

8. The computing device of claim 7, wherein a distance between the measurement point and a corresponding approach point is equal to the approach distance, and a direction from the corresponding approach point to the measurement point is in the same direction as a direction of a corresponding initial vector of the probe.

9. The computing device of claim 6, wherein the coordinates of the center of the probe are obtained according to a focus position of an optical lens of a camera installed on the CMM.

10. The computing device of claim 6, wherein a magnitude of the ricochet vector of the probe is 1.

11. A non-transitory computer-readable storage medium storing a set of instructions, the set of instructions capable of being executed by a processor of a computing device to implement a method for determining ricochet vectors of a probe of a coordinate measuring machine (CMM), the method comprising:
setting an approach distance between the probe and a manufactured object, and storing the approach distance into a storage system of the computing device;
obtaining coordinates of a center of the probe and an initial vector of the probe for each measurement point of the manufactured object when the probe is manually operated to measure the manufactured object;
fitting a measurement element of the manufactured object according to all measurement points of the manufactured object; and
for each measurement point, calculating an approach point of the manufactured object according to the approach distance and the initial vector of the probe, determining a position relation between the approach point and the measurement element of the manufactured object, calculating a ricochet vector of the probe according to the position relation, and storing the ricochet vector of the probe into the storage system.

12. The storage medium of claim 11, wherein the method further comprises:
calculating coordinates of a contact point of the manufactured object for each measurement point according to the coordinates of the center of the probe and the ricochet vector of the probe, and storing the coordinates of the contact point into the storage system, wherein the probe contacts the manufactured object at the contact point when the CMM performs automatic measurement of the manufactured object.

13. The storage medium of claim 11, wherein a distance between the measurement point and a corresponding approach point is equal to the approach distance, and a direction from the corresponding approach point to the measurement point is in the same direction as a direction of a corresponding initial vector of the probe.

14. The storage medium of claim 11, wherein the coordinates of the center of the probe are obtained according to a focus position of an optical lens of a camera installed on the CMM.

15. The storage medium of claim 11, wherein a magnitude of the ricochet vector of the probe is 1.

* * * * *